Aug. 30, 1955     M. E. McCLELLAN     2,716,317

CROP PICKUP, COMPRESSER AND CUTTER

Filed Jan. 4, 1954     2 Sheets-Sheet 1

*INVENTOR.*
M. E. McCLELLAN

ATTORNEYS

Aug. 30, 1955  M. E. McCLELLAN  2,716,317
CROP PICKUP, COMPRESSER AND CUTTER
Filed Jan. 4, 1954  2 Sheets-Sheet 2

*INVENTOR.*
M. E. McCLELLAN

ATTORNEYS

United States Patent Office 2,716,317
Patented Aug. 30, 1955

2,716,317
CROP PICKUP, COMPRESSER AND CUTTER

Marcus E. McClellan, Ottumwa, Iowa, assignor to Deere Manufacturing Co., Dubuque, Iowa, a corporation of Iowa Application January 4, 1954, Serial No. 401,908

18 Claims. (Cl. 56—1)

This invention relates to an agricultural machine and more particularly to a machine for harvesting or gathering hay crops and compressing the crops into compact form for feeding to animals.

It is well known in the agricultural field to utilize a baler of the mobile pickup type for harvesting previously cut hay crops and for forming these crops into bales. These bales are of relatively good size and weigh on the order of from sixty to one hundred pounds. Before they can be fed to animals, they must be cut apart into smaller portions. Some of the well known balers tie the bales with twine and others use wire. In either case, the tying medium must be cut and disposed of before the cut portions can be fed. In addition to that, the bales are relatively heavy and, although perhaps more readily shipped than crops in any other form, have many disadvantages such as those encountered in storage and handling when used by the individual livestock feeder.

According to the present invention, these disadvantages are eliminated by the provision of a machine that will form the crops not into bales but into relatively small pellets or cakes of a type and size not heretofore known. These pellets or cakes may be easily handled and may be fed directly to the animals, since they do not depend upon wire, twine or other encircling non-edible medium for coherency. Rather, the machine that forms these cakes or pellets utilizes relatively high pressures to compact the picked up crops into a relatively thin mat that is ultimately cut into smaller pieces to form the cakes or pellets, the coherency of each cake depending in large part upon the compacting pressure applied. As a further expedient, an edible binder, such as some of the well known pectins may be used. Such binder may be in liquid or semi-liquid form and may be fed to the crops just prior to the subjection of the crops to pressure, and the binder therefore contributes to the coherency of the mat. It is a feature of the invention to use rolls as the compressing means and to associate with the rolls a stripper or scraper for keeping the rolls clean and to prevent the accumulation thereon of crop and binder.

The invention features a novel cake- or pellet-forming mechanism, preferably comprising a plurality of tubular members arranged for reciprocation in association with a table that backs up the mat. As successive cakes are cut, they are forced upwardly in the tubular members in magazine fashion and the cakes or pellets ultimately fill the tubes, after which succeeding cakes force the uppermost cakes out of the tube for transfer to a point of discharge. The tubular members are restricted at their discharge ends to further compact the cakes or pellets. In a preferred embodiment of the invention, the upper or discharge portions of the tubes are arranged in an inclined plane so that as the cakes are ejected therefrom, they move downwardly along the inclined plane for ultimate collection.

It is a further object of the invention to design the machine on the basis of a simple and inexpensive mobile outfit that may be readily drawn over the field by tractors or other vehicles commonly used on the farm.

The foregoing and other important objects and desirable features inherent in and encompassed by the invention will become apparent as a preferred embodiment of the invention is disclosed in detail in the following specification and accompanying sheets of drawings, the several figures of which will be described immediately below.

Fig. 4 is a fragmentary sectional view as seen along the line 4—4 of Fig. 2.

Fig. 5 is a fragmentary transverse sectional view as seen substantially along the line 5—5 of Fig. 1.

Figure 1:
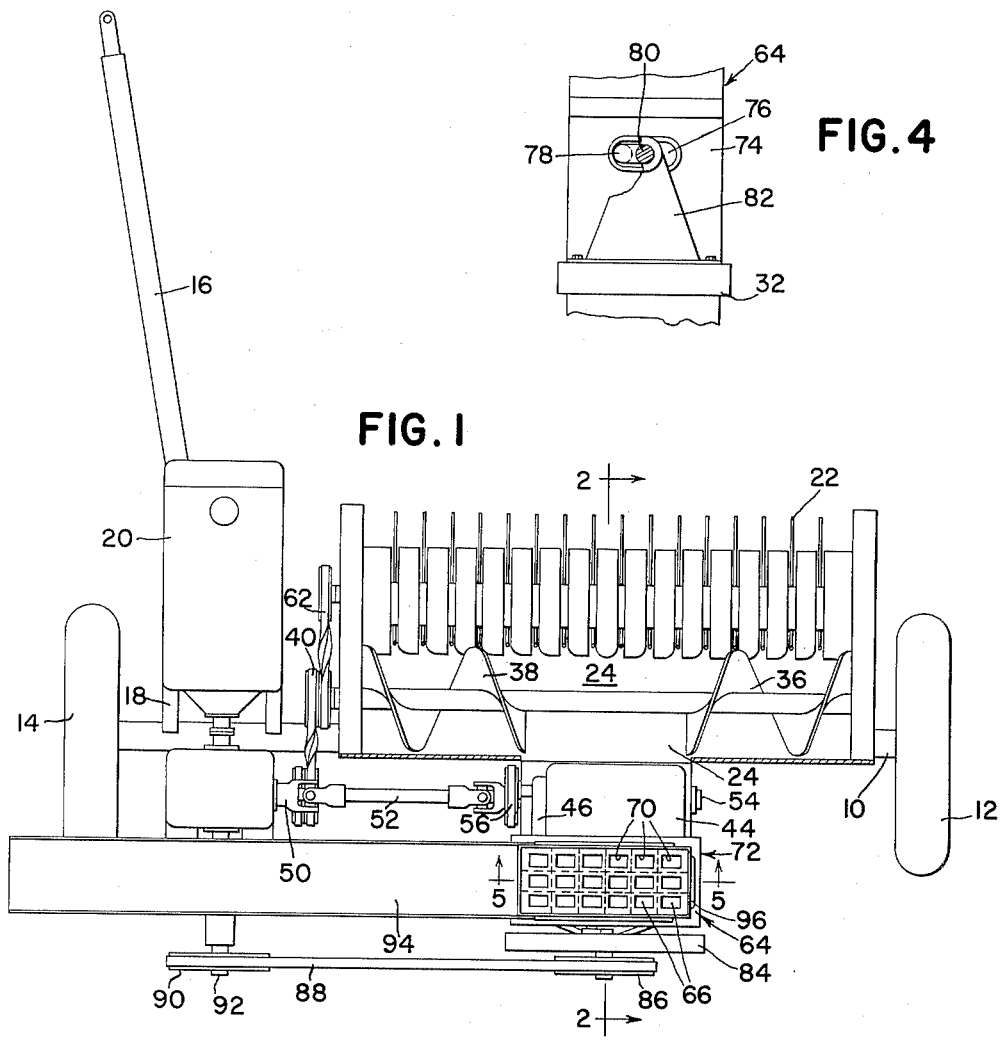
Fig. 1 is a plan view of the machine with parts broken away and shown in section.

The machine comprises essentially a mobile frame including a transverse axle or support 10 carried on right- and left-hand wheels 12 and 14 and having a forwardly extending draft tongue 16 by means of which the machine may be connected to any suitable source of draft power, such as a tractor (not shown). The main frame includes an auxiliary frame 18 rigid thereon, which serves as means for mounting a power source such as an internal combustion engine designated generally by the numeral 20. As in the case of other agricultural machines, the machine-mounted power source may be dispensed with and power taken directly from the draft vehicle by the conventional power take-off shaft. These details are relatively unimportant and the machine-mounted power source or internal combustion engine 20 is shown here merely as representative of one form of power source that could be used.

The axle 10 carries thereon between the right-hand wheel 12 and the engine 20 a forwardly extending pickup mechanism 22 of a type not unlike that heretofore used in pickup balers and forage harvesters. Again, the details are unimportant.

The support means comprising the axle 10 and wheels 12 and 14 further includes a horizontal and rearwardly extending deck 24 onto which the crop-gathering means or pickup mechanism 22 delivers crops as the crops are picked up from the field. Rearwardly of and contiguous with the deck 24 is a deck extension 26 apertured at 28 to receive the upper portion of a lower compressing roller 30 and terminating in a table or like means 32 for backing up the mat formed by the roller 30 in cooperating with an upper compressing roller 34, the two rollers comprising compressing means for receiving the crops, for compressing the crops into a relatively thin mat, as at M, and for moving the mat rearwardly onto the table means 32. The deck extension 26 and its table 32 are relatively narrower than the pickup deck 24 and for that reason the deck 24 carries means for compressing the crops laterally into a crop stream, designated generally by the letter S. The lateral compressing means preferably takes the form of right- and left-hand auger flights 36 and 38 mounted on a common shaft that is driven at its left-hand end by a belt 40 from a lower power shaft 42 driven by the engine 20.

Figure 2:
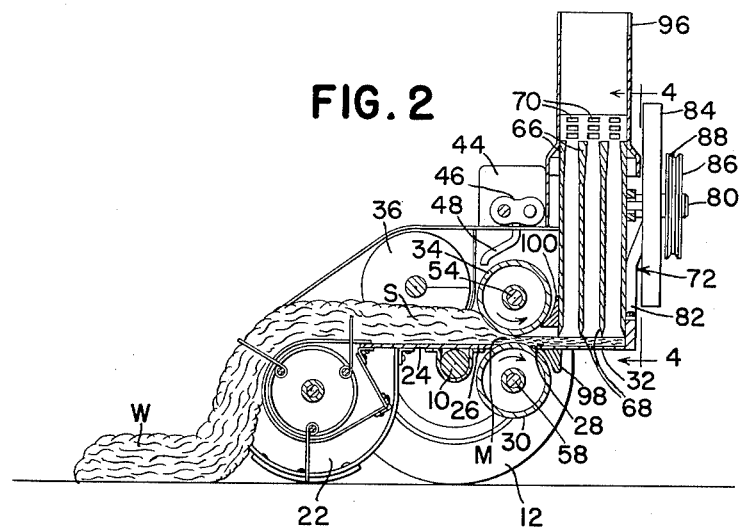
Fig. 2 is a longitudinal sectional view of the machine as seen substantially along the line 2—2 of Fig. 1.
Figure 3:
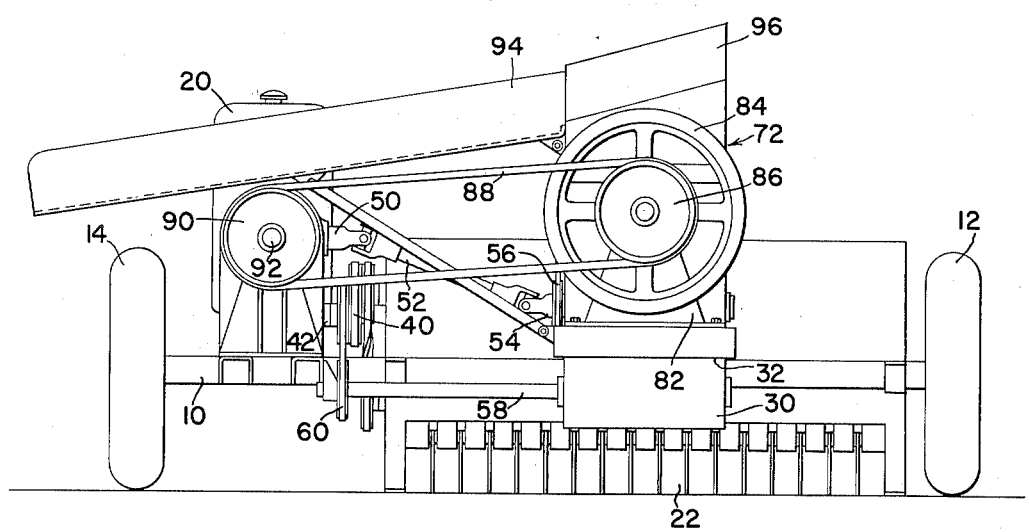
Fig. 3 is a rear elevational view of the machine.

From the description thus far, it will be understood that the crops lie on the ground in a relatively wide windrow, designated generally by the letter W in Fig. 2, from which windrow the pickup mechanisms or gathering means 22 is effective to transfer the crops to the deck 24, after which the continuously operating augers 36 and 38 compress the crops laterally into the stream S. The rearward rotation of the pickup means 22, as well as that of the augers 36 and 38, is effective to keep the stream moving rearwardly to the rolls 30 and 34. These rolls rotate as indicated by the arrows in Fig. 2 and not only compact the stream S into the mat M but move the mat M rearwardly onto the table 32. The compressive forces exerted by the compressing means comprising the rollers 30 and 34 intensify the coherency of the crops so that they essentially retain their mat-like form even after passing behind the rollers. However, as a further expedient in contributing to the coherency of the mat, the machine may be equipped with a tank 44 from which a pump 46 draws a liquid or semi-liquid substance in the form of a binder, such as any of the well known edible pectins, the pump supplying this binder through a tube 48 to a point just ahead of the rolls 30 and 34 so that the pressure of the rolls combines with the added binder to intensify the mat-like form ultimately produced. The pump may be driven in any convenient manner, such as that shown, wherein an upper output shaft 50 from the engine 20 drives, through flexible shafting 52, a shaft 54 to which the upper roller 34 is keyed. The drive from the shaft 54 to the pump may be by a belt, as shown at 56. The lower roller is shown as being mounted on a shaft 58 which is driven as by a belt 60 from the lower engine shaft 42. The pickup device 22 may be driven from the auger shaft by means of a belt 62.

A significant feature of the machine is the means for forming the mat into a plurality of pellet- or cake-like components. This means is designated generally by the numeral 64 and comprises reciprocating means including a plurality of integrally related upright tubes 66, the lower ends of which are provided with cutting means or blades 68 and the upper ends of which are restricted in section as at 70 for purposes to presently appear.

The entire means or reciprocating element 64, made up of the tubes 66, is carried for reciprocation on the support means by any suitable structure, designated in its entirety by the numeral 72. The rearward part of the means 64 is in the form of a plate 74 having therein an elongated slot 76 in which runs a crank pin 78 forming part of a crankshaft 80 journaled in a bearing 82 that rises from the table 32. The rear end of the crankshaft 80 has keyed thereto a flywheel 84 and a sheave 86, the latter being driven by a belt 88 from a sheave 90 keyed to an output shaft 92 powered by the engine 20. As the crankshaft 80 is rotated, the crank pin 78 reciprocates the means 64 vertically, the stroke being such that the cutters or blades 68 will penetrate the portion of the mat M that lies on or is backed up by the table 32.

As the mat is cut, the cakes or pellets thus formed move upwardly in the respective tubes 66 in magazine fashion (Fig. 5) and ultimately the uppermost of the cakes is ejected or discharged through the restricted upper ends 70 of the tubes, the restricted sections 70 serving to further compact or compress the cakes or pellets.

The upper ends 70 of the tubes 66 terminate in an inclined plane, so that as the uppermost cakes or pellets are discharged (shown at C in Fig. 5) they will be caused to move downhill and to the left, whence they move onto a laterally and leftwardly extending trough 94. The machine may be operated with a wagon or other receptacle (neither of which is shown) to receive the cakes or pellets upon discharge thereof from the left-hand or discharge end of the trough 94. The upper end of the means 64 includes suitable structure in the form of a U as viewed from above to provide a three-sided retaining structure 96 at the upper end of the means so that the discharged or ejected cakes or pellets cannot escape except onto the trough 94.

In operation, the machine is drawn over the field in the manner already indicated, the pickup means 22 operating to pick up crops from the windrow W and to transfer these crops rearwardly onto the deck 24, at which point the augers 36 and 38 operate to confine or compress the crops laterally to the crop stream S. As the stream moves rearwardly between the rollers 30 and 34, it is materially compacted into the relatively thin mat M and the mat moves rearwardly onto the table 32. The continuously reciprocating means 64 cuts the mat into cakes or pellets and the mat is continually fed onto the table 32 and under the cutter so that this result is achieved. The coherency of the mat is increased or intensified, as indicated by the supply through 44—46—48 of the edible binder. The compressor rolls 30 and 34 have respectively associated therewith strippers or scrapers 98 and 100 for preventing an accumulation of crops and/or binder on the rolls.

As the cakes are formed and accumulate upwardly in magazine fashion in the tubes 66, the uppermost of the cakes are ultimately ejected through the upper restricted ends 70 of the tubes and, because of the downhill and leftward slope of the upper end of the means 64, the cakes move laterally to the left out onto the conveyor or trough 94 for ultimate receipt by any suitable receptacle. The cakes or pellets thus formed are relatively small and are therefore easy to handle. They may be fed to animals in quantities indicated by the size and density of the cakes. It will be appreciated, of course, that the pressure caused by the compressor rolls 30 and 34 may be adjusted and the sizes of the tubes 66 varied to form cakes of acceptable form depending upon the nature and type of the animal to be fed. In the case of cattle, for example, the cakes may be conveniently made of cud size, which is not only palatable but convenient for the animal.

Other specific features of the invention not categorically enumerated herein, as well as numerous modifications and variations in the preferred form illustrated and in the particular uses thereof will undoubtedly occur to those versed in the art, all of which may be achieved without departing from the spirit and scope of the invention.

What is claimed is:

1. An agricultural machine of the character described, comprising: a mobile frame adapted to advance over a field of crops such as hay and the like; crop-gathering means on the frame and operative to gather crops from the field and to move such crops rearwardly in a crop stream; crop-compressing means on the frame rearwardly of the crop-gathering means and engageable with the crop stream and operative to exert a vertical force on said stream for compressing said stream into a relatively thin mat; a mat-receiving table means on the frame rearwardly of the compressing means; means on the frame engageable with the mat for moving said mat rearwardly onto the table means; and cutting means movable on the frame downwardly toward the table means and including a plurality of upright tubular cutters having lower cutting edges engaging the mat for cutting the mat into a plurality of relatively small cakes.

2. The invention defined in claim 1, including: means on the frame and connected to the cutting means for reciprocating said cutting means toward and away from the mat; said mat-moving means and the reciprocating means being timed so that the mat-moving means moves successive portions of the mat rearwardly under the cutting means each time the cutting means moves upwardly.

3. The invention defined in claim 2, in which: the tubular cutters are relatively tall and have open upper ends and the cakes cut thereby from the mat are forced upwardly therein as successive cuts are effected, whereby uppermost cakes in the cutters are ejected at the tops of the cutters; and means is provided on the frame for receiving the successively ejected cakes.

4. The invention defined in claim 3, in which: the cutters are of different heights and terminate at their tops in an inclined plane so that the ejected cakes are caused to move crosswise of the path of the reciprocation of the cutting means.

5. The invention defined in claim 1, including: means on the frame and connected to and for reciprocating the cutting means relative to the table means; the tubular cutters are relatively tall and have open upper ends and the cakes cut thereby from the mat are forced upwardly therein as successive cuts are effected, whereby uppermost cakes in the cutters are ejected at the tops of the cutters; and means on each cutter adjacent to its open end for restricting the cross-section of the respective cutter for further compressing the cakes prior to ejection.

6. An agricultural machine of the character described, comprising: fore-and-aft support means having thereon means for receiving crops such as hay and the like; means movable rearwardly on the support means for moving such crops rearwardly in a crop stream; crop-compressing means on the support means and engaging the crop-stream for compressing the stream into a relatively highly compressed mat and for moving said mat further rearwardly; means on the support means rearwardly of the compressing means and over which the mat is moved from the compressing means, said last named means having a plate-like portion backing up one side of the mat; and a reciprocating cutter on the support at the other side of the mat and movable toward and away from the plate-like portion and having a plurality of blades to engage the mat and cut said mat into a plurality of cake-like components.

7. An agricultural machine of the character described, comprising: support means having thereon means for receiving crops such as hay and the like and for moving such crops along a defined path; compressing means on the support means and positioned along the path and beyond the receiving means for engaging the moving crops and compressing said crops into a relatively tightly compacted mat; means on the support means engaging and advancing the mat; and means on the support means beyond the mat-advancing means and including a plurality of mat-engaging elements for forming the mat into a plurality of cake-like components.

8. An agricultural machine of the character described, comprising: support means having thereon means for receiving crops such as hay and the like and for moving such crops along a defined path; compressing means on the support means and positioned along the path and beyond the receiving means for engaging the moving crops and compressing said crops into a relatively tightly compacted mat; means on the support means engaging and advancing the mat; and means on the support means beyond the mat-advancing means and including elements having wall portions and mat-severing portions, means for moving said elements and the mat relatively for severing portions of the mat from the main body of the mat and for forcing said mat portions between the wall portions, and compacting means cooperative with the wall portions and engaging the mat portions to compact said mat portions, said wall portions leading to a discharge end beyond the compacting means and through which the compacted mat portions are discharged in the form of individual cakes.

9. An agricultural machine of the character described, comprising: support means having thereon means for receiving crops such as hay and the like and for moving such crops along a defined path; compressing means on the support means and positioned along the path and beyond the receiving means for engaging the moving crops and compressing said crops into a relatively tightly compacted mat; means on the support means engaging and advancing the mat; and means on the support means beyond the mat-advancing means and including a backing member on the support means and backing up the mat from one side thereof, and cutting means, including a plurality of mat-engaging cutting elements, movable toward and away from the backing member from the other side of the mat to cut the mat into a plurality of individual cakes.

10. The invention defined in claim 9, including: tubular means associated with the cutting means for receiving the cakes, said tubular means having a discharge end; and means for moving the tubular means and the cakes relatively to force the cakes through the tubular means toward said discharge end, said tubular means having restricting means adjacent to said discharge end for further compacting the cakes.

11. An agricultural machine of the character described, comprising: support means having thereon means for receiving crops such as hay and the like and for moving such crops along a defined path; compressing means on the support means and positioned along the path and beyond the receiving means for engaging the moving crops and compressing said crops into a relatively tightly compacted mat; means on the support means engaging and advancing the mat; means on the support means beyond the mat-advancing means and including plate means on the support means and backing up the mat from one side thereof, and cuting means reciprocable in cutting and retracting strokes respectively toward and away from the mat at the opposite side of the mat, said cutting means comprising a plurality of tubes in side-by-side relation and substantially parallel to the line of reciprocation and having mat-proximate ends in the form of cutters arranged in a plane generally parallel to the plane of the plate means; means for reciprocating the cutting means for cutting the mat into individual portions respectively received in the tubes; and means connected to the mat-advancing means for feeding the mat between the plate means and the cutters to supply uncut portions of the mat to the cutting means while the tubes are on their retracting strokes.

12. The invention defined in claim 11, in which: the tubes respectively have terminal ends relatively remote from the mat and toward which ends successive cut portions of the mat are respectively forced as the cutting means reciprocates.

13. The invention defined in claim 12, in which: the tubes are respectively restricted in cross-section between their mat-proximate ends and their remote ends to further compact the cut mat portions.

14. The invention defined in claim 13, in which: the remote ends of the tubes are open to provide for discharge of the cut mat portions as individual cakes; and the support means carries means for receiving the discharged cakes.

15. The invention defined in claim 7, in which: the cake-forming means includes a plurality of parallel tubes perpendicular to the plane of the mat and movable to transverse that plane, each tube having a mat-proximate end formed with a peripheral cutting edge and a mat-remote end, each tube receiving successively cut cakes in magazine fashion to move the cakes toward said mat-remote end.

16. The invention defined in claim 15, in which: the mat-remote end of each tube is open to provide for ejection of successive cakes and each mat-remote end is restricted in cross-section to further compress the cakes.

17. An agricultural machine of the character described, comprising: support means having thereon means for receiving crops such as hay and the like and for moving such crops along a defined path; compressing means on the support means and positioned along the path and beyond the receiving means for engaging the moving crops and compressing said crops into a relatively tightly compacted mat; means on the support means for supplying to the crops an edible binder contributing to the coherency of the mat; means on the support means engaging and advancing the mat; and means on the support means beyond the mat-advancing means and including a plurality of mat-engaging elements for forming the mat into a plurality of cake-like components.

18. The invention defined in claim 17, in which: the compressing means comprises rolls through which the mat is moved; and the binder supply means supplies binder to the crops just ahead of the rolls.

References Cited in the file of this patent

UNITED STATES PATENTS

| 199,394 | Aldrich | Jan. 22, 1878 |
| 204,757 | Price | June 11, 1878 |
| 1,340,225 | Howard | May 18, 1920 |
| 2,612,852 | Morrison | Oct. 7, 1952 |
| 2,658,323 | Russell | Nov. 10, 1953 |